United States Patent [19]

Le Goffic et al.

[11] Patent Number: 5,086,425
[45] Date of Patent: Feb. 4, 1992

[54] ARRANGEMENT FOR TRANSFORMING DATA PACKETS INTO A REGULAR MULTIPLEX FOR A TRANSMISSION SYSTEM UTILIZING THE TDMA PRINCIPLE

[75] Inventors: Yves H. M. Le Goffic; Roland Y. J. M. Soulabail, both of Lannion, France

[73] Assignee: Telecommunications Radioelectriques et Telephoniques, Paris, France

[21] Appl. No.: 651,056

[22] Filed: Feb. 4, 1991

Related U.S. Application Data

[63] Continuation of Ser. No. 280,419, Dec. 6, 1988, abandoned.

[30] Foreign Application Priority Data

Dec. 18, 1987 [FR]  France .................................. 87 17711

[51] Int. Cl.$^5$ .......................... H04J 3/02; H04J 3/26
[52] U.S. Cl. ..................................... 370/84; 370/94.1
[58] Field of Search .................. 370/94.1, 79, 84, 112, 370/110.1

[56] References Cited

U.S. PATENT DOCUMENTS

| | | | |
|---|---|---|---|
| 3,989,892 | 11/1976 | Yoshida et al. | 370/56 |
| 4,477,899 | 10/1984 | Kato et al. | 370/94 |
| 4,556,972 | 12/1985 | Chan et al. | 370/94 |
| 4,763,319 | 8/1989 | Rozenblit | 370/84 |
| 4,887,261 | 12/1989 | Roempp | 370/84 |
| 4,979,166 | 12/1990 | Yamada | 370/84 |

Primary Examiner—Douglas W. Olms
Assistant Examiner—Min Jung
Attorney, Agent, or Firm—David R. Treacy

[57] ABSTRACT

In a data packet transmission system, a disturbing delay is produced for the speech channels during the transformation of the data packets into a regular multiplex. A transformation arrangement permitting to minimize this delay is comprised of a storage unit 1 in which the data are stored, for example, in the form of multi-frames, reading this memory being effected in a different sequence, packet-by-packet, by addressing means 4 in accordance with predetermined addressing rules for the reconstruction of a standard multiplex. Such an arrangement is advantageously used when data packets are transmitted at different rate speeds.

3 Claims, 5 Drawing Sheets

ARRANGEMENT FOR TRANSFORMING DATA PACKETS INTO A REGULAR MULTIPLEX FOR A TRANSMISSION SYSTEM UTILIZING THE TDMA PRINCIPLE

This is a continuation of application Ser. No. 280,419, filed Dec. 6, 1988 now abandoned.

BACKGROUND OF THE INVENTION

The present invention relates to an arrangement for transforming a sequence of data packets into a regular or standard (time-division) multiplex for a data transmission system utilizing in one transmission direction the TDMA principle (Time-Division Multiple-Access), the transmission system being constituted by a network comprising a main station and sub-stations transmitting data packet-by-packet in time slots of the TDMA frames shared by and assigned to different sub-stations, the consecutive TDMA frames being transmitted to the main station to be transformed there into a regular multiplex in accordance with a predetermined frame, the arrangement being formed on the basis of a storage unit into which the data are entered.

Such an arrangement is described in the French Patent Application No. 86 17 864 filed on Dec. 19, 1986. It is accommodated in a system for transmitting data via a radio link of the point-multipoint type constituted by a network comprising a main station and a plurality of sub-stations. Such a configuration is often used to form a distributed telephone concentrator. In the direction from the main station to the sub-stations, the transmission is effected by broadcasting: the main station sends to all the sub-stations in accordance with a conventional (time division) multiplex mode. In the direction from the sub-stations to the terminal station the transmission is effected packet-by-packet and in accordance with the TDMA principle (Time-Division Multiple-Access): a sub-station does not send until a time slot has been assigned to it and in this time slot only this station can send. All the sub-stations are in synchronism with the main station and their transmission time bases are adjusted such that their distance (to the main station) is taken into account, to ensure that the sent data arrive without overlap at the main station. To that end guard periods are provided between all sent packets.

This system can thus be used to realize a telephone concentrator, in this case each packet sent by a sub-station which regroups a plurality of octets of a speech channel, represents a 64 kbit/s rate when the speech channel is encoded in accordance with the PCM method. But a rate of 64 kbit/s can be divided between several sub-stations for also retransmitting low-rate synchronous data links (for example 1200 bit/s). The French Patent Application mentioned in the foregoing describes an arrangement adapted to this type of transmission. In accordance with said application, to divide a channel between a plurality of data links which can originate from different sub-stations without the use of a large number of 64 kbit/s rates for the retransmission of low-rate data links, a frame and multi-frame structure is given to the TDMA transmission. Thus, a multi-frame is formed from n frames and the packets of one channel are assigned to a data link every n frame (n being higher according as the rate of the link is lower). At the main station, the sequence of packets of a channel conveying the different data links is transformed into a regular time-division multiplex in accordance with a predetermined frame. In the arrangement described, the transmission and the reception of the packets is particularized as follows.

On the one hand, in a sub-station, the transmission of a packet relating to a data link is effected in the frame or frames assigned to it via low-rate data transmission means (described in said Patent Application). The transmission of data is consequently effected with a delay caused by arranging the data into packets, this delay being the longer the lower the rate of the data link.

On the other hand, in the main station, the transformation or conversion of the sequence of packets for the reconstruction in a regular multiplex in accordance with a predetermined frame is effected when a complete multi-frame of packets has been received. This transformation then causes a delay which is a function of the position of the packets in the multi-frame, this delay can therefore be as long as the total duration of the multi-frame. Although this delay may not be too annoying as regards the data transmission, on the other hand it may be a disadvantage when it affects speech channels. Actually, in that case, this additional delay is added to the delays produced by the packetizing of the signal and the passage through the telephone network and may cause an increase of the echo path, such that this echo may become annoying for a telephone conversation.

SUMMARY OF THE INVENTION

The present invention has for its object to provide an arrangement for transforming a sequence of data packets into a regular multiplex, more specifically for a system of the type mentioned in the foregoing, by means of which said drawback can be avoided by reducing the delay produced in the main station during the transformation of the sequence of packets into a regular multiplex.

To that end, the arrangement for transforming a sequence of data packets is characterized in that it further includes addressing means for writing time slots of a multi-frame formed by a plurality of frames into the storage unit and for reading the storage unit packet-by-packet in accordance with predetermined addressing rules to minimize the delay caused during the data packet transformation for reconstruction into a time-division multiplex in accordance with a predetermined frame, writing the beginning of a packet, whatever its position in the multi-frame, being followed as rapidly as possible by its read-out. The delay thus minimized no longer causes any annoying echo during a transmission of speech channels.

BRIEF DESCRIPTION OF THE DRAWING

The following description, given by way of non-limitative example with reference to the accompanying drawings, will make it better understood how the invention can be put into effect. In the drawing.

DETAILED DESCRIPTION OF THE INVENTION

Figure 1:
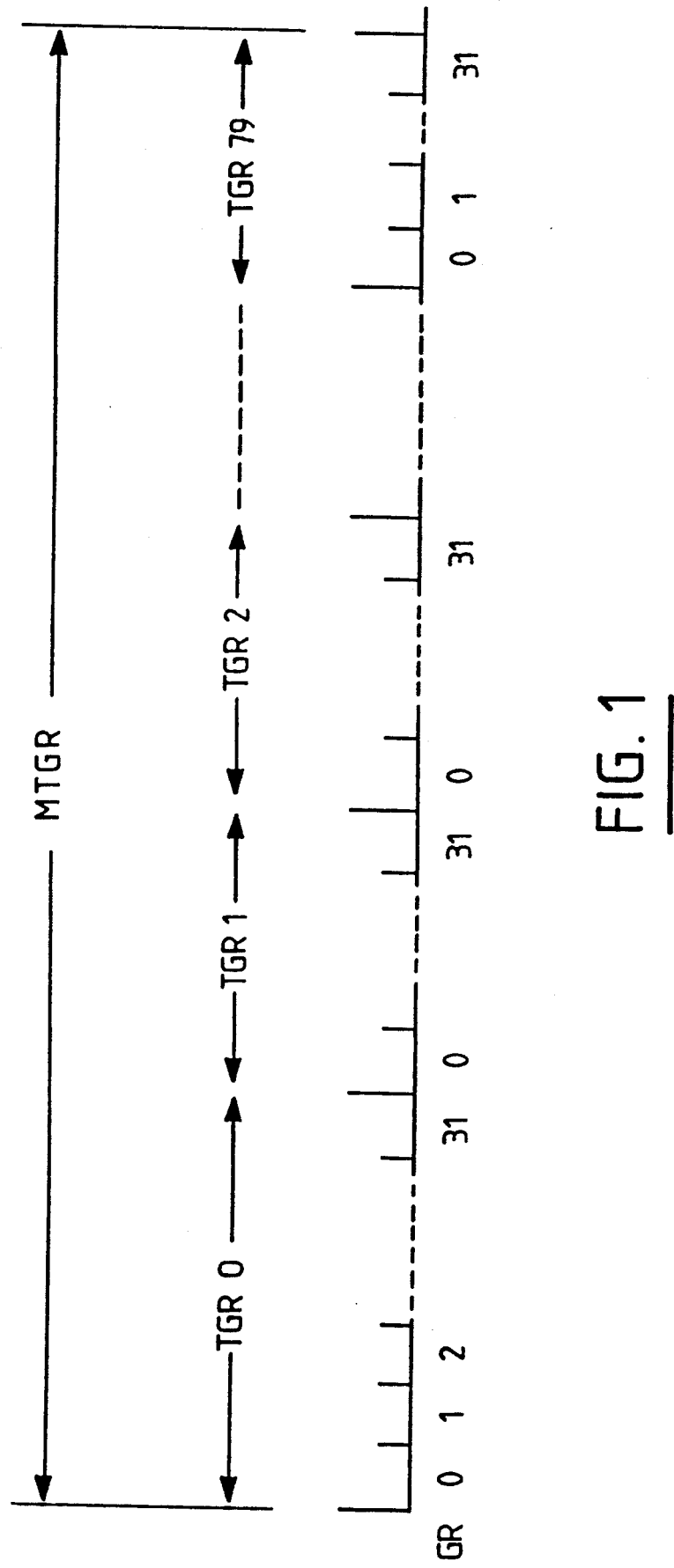
FIG. 1 shows a frame organisation example suitable for use in accordance with the invention in a transmission system of the type defined in the opening paragraph.

FIG. 1 proposes a frame organisation example, which, and that for a better understanding, allows a rapid recall to mind of the structure of the TDMA frame and multi-frame used in the information transmission system.

In the TDMA direction, that is to say in the direction from the sub-stations to the main station, the data transmission is effected in time slots denoted GRO to GR31 within a frame TGR.

Each time slot GR has a safety guard during which there is no transmission, which causes an uncertainty as regards the time of arrival of the data at the main staion. To reduce the influence of the safety guard on the efficiency of the transmission rate, each time slot GR corresponds.

The time slot GRO is reserved for a semaphore channel which can be seized in a random manner by each one of the stations.

The time slot GR1 which mainly serves to check the delay of the stations, is seized successively by each one of the stations.

The time slots GR2 to GR31 can be seized by each of the sub-stations, under the control of the main station, to convey information. Each slot contains a packet of 72 octets, formed as follows:

1 octet as guard time during which there is no transmission;

5 clock octets permitting to recover the clock on reception;

1 octet as preambel RDP for marking the beginning of the packet;

1 octet for channel-by-channel signalling when the packet is assigned to a speech channel;

64 information octets. When the time slot is assigned to a speech channel these 64 octets correspond to the packetizing 8 ms speech.

As the encoding of speech of is effected at 8 kHz, this frame structure results in a rate equal to 2.304 Mbit/s.

To permit dividing of a time slot GR between a plurality of data links, the TDMA frames are advantageously organized, for example and in a non-limitative manner, in accordance with a multi-frame MTGR which is similar to that of the multiplex frame described in CCITT recommendation X.50.

This multiplex comprises 80 envelopes of 8 bits. In each octet, the first bit is inter alia utilized to synchronize the frame of the multiplex, the 6 subsequent bits convey the data, while the last bit can be used as service bit.

In a 64 kbit/s rate, the rates conveyed via the different channels then have the following respective values:

600 bit/s over a 800 bit/s channels taking one envelope out of 80;

1200 bit/s over a 1600 bit/s channels, taking one envelope out of 40;

2400 bit/s on a 3200 bit/s channels, taking one envelope out of 20;

4800 bit/s on a 6400 bit/s channel, taking one envelope out of 10;

9600 bit/s on a 12800 bit/s channel, taking one envelope out of 5;

19200 bit/s on a 25600 bit/s channel, taking two envelopes out of 5.

The TDMA multi-frame (MTGR) will then convey 80 TGR frames, denoted TRGO to TRG79. Each time slot GR has a duration of 0.25 ms, each frame TGR has a duration of 8 ms and consequently the multi-frame MTGR consisting of 80 frames has a duration of 640 ms.

In the multiplex transmission utilized in the direction from the main station to the sub-stations, there is multi-frame synchronisation every 640 ms, the TDMA multi-frame (MTGR) being adjusted thereto.

Thus, in a sub-station, the transmission as regards a low-rate data link will be effected in the time slot GR which is assigned for effecting the multiplexing operation and solely during the frame or frames TGR allocated to this data link.

One issue of a packet contains 384 information bits (6×64).

For a transmission at 600 bit/s this corresponds to 640 ms of information, while for a transmission at a rate of, for example, 4800 bit/s this corresponds to 80 ms of information.

In one time slot GR, the main station receives information components coming from a plurality of data links. It transforms these data, which are received in the form of packets, into a 64 kbit/s multiplex, which in the embodiment opted for here is in accordance with Recommendation X.50.

The simplified basic diagram of the main station is shown

The receiving part PR connected to an antenna A1, renders it possible to receive the information components transmitted by the sub-station during the different time slots GR. Its output is connected to an aligning arrangement AL which is controlled by a time base BTP by means of the signal B1. One part of the time base BTP operates at the 2.304 MHz clock rate of the multi-frame packet and another parts operates at the clock rate of 2,048 MHz (64/72) of the internal multiplex comprising 32 time slots. Thanks to the presence of octets RDP indicating the beginning of the packet, the aligning arrangement A1 renders it possible to sort the information components received and to apply them, regularly spaced in the 32 time slots of the multiplex, to a bus MXR. The channel-by-channel signalling is performed within time slot 1 and the 64 information octets of each time slot GRn are present in the time slot n during 64 consecutive frames. The bus MXR is intended for equipment connected to the station. The time base BTP also controls, by means of the signal B2, a demultiplexer DM which extracts the channel-by-channel signalling V/V and the semaphore channel CS intended for a calculator C.

The time base BTP additionally controls, by means of the signal B2, a multiplexer M which regroups the channel-by-channel signalling components V/V, the semaphore channel CS transmitted by the calculator C, the frame alignment signal components VT and the information components MXE sent during the time slots of the multiplex by the apparatus connected to the station. This multiplexer M is followed by a circuit CV which effects the rate change from the rate of the 2.048 Mbit/s multiplex into the rate of a 2.304 Mbit/s multiplex under the control of the signal B3 output by the time base BTP. The output of the circuit CV is connected to the transmitter PE which is connected to an antenna A2.

In addition, the main station includes the arrangement MRT for transforming the packets into a regular multiplex to recover in accordance with a predetermined frame TP the data transmissions at different low rates which are organized around a storage unit in which the data are written. In order to recover the different low-rate transmissions, the arrangement MRT according to the invention furthermore includes addressing means for writing the time slots of a multi-frame formed from several frames into the storage unit and for reading the storage unit packet-by-packet in accordance with predetermined addressing rules to minimize the delay caused during the transformation of the data packets for the reconstruction into a multiplex in accordance with the predetermined frame TP; writing the beginning of a packet, whatever its position in the multi-frame, being followed as rapidly as possible by its read-out.

Consequently, by means of the arrangement MRT it is possible to transform the information components PK received during a time interval n and having the structure of a multi-frame packet which itself is received during a time slot GRn, into a regular 64 kbit/s multiplex, which in this example is chosen in accordance with Recommendation X.50, without effecting, in accordance with the basic idea of the invention, additional delay during this transformation. The arrangement MRT is synchronized by means of the signal SY and is controlled by a clock signal S8 having a frequency of 8 kHz, both these signals being supplied by the time base BTP. The arrangement MRT receives also the information signal DEB which relates to the speeds of the rates supplied by the calculator C and the frame alignment signal VT.

The packet multi-frame constituted in a time slot GRn which is found again in the time interval n then comprises 80 packets in this example. Each packet, comprising 64 information octets, is conveyed in the time interval in 8 ms. The 80 packets are consequently conveyed in 640 ms.

Figure 3:
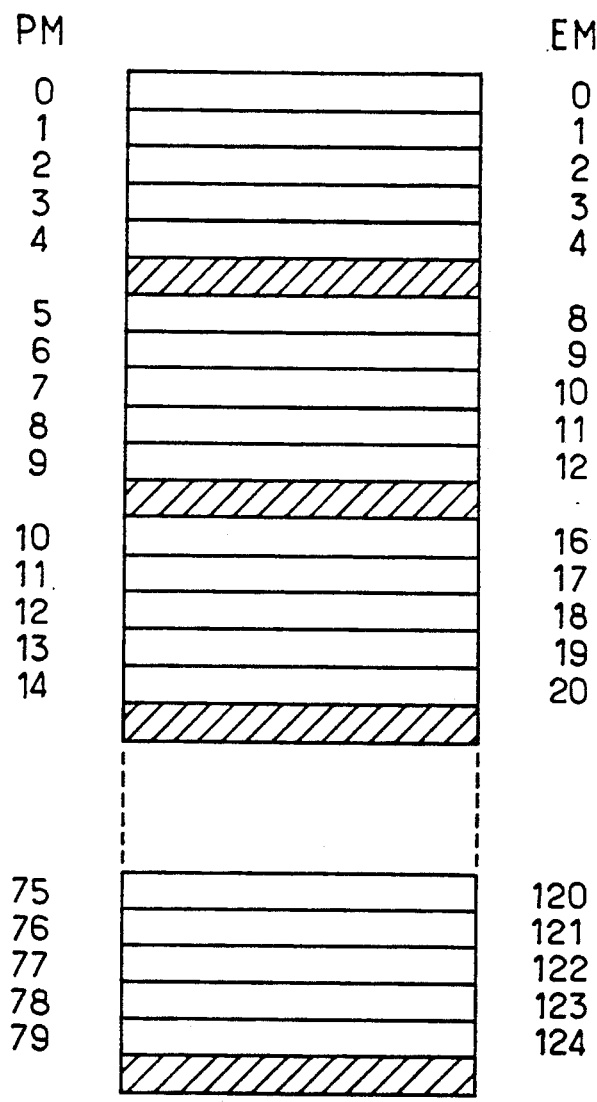
FIG. 3 shows the correspondance between the packet numbers in the multi-frame and the storage unit locations in which the packets are written.

This packet multi-frame, relating to a time interval and organized in the present example in the same manner as the frame of Recommendation X.50, is stored in a storage unit which in accordance with a characteristic feature of the invention is constituted by a random-access memory. The different packets PM, consisting of 64 octets, numbered from 0 to 79 in the multi-frame, are entered in the locations EM of said memory (0 to 124). FIG. 3 shows the correspondence between the numbers of the packet PM in the multi-frame and the locations EM of the memory in which the packets are written. To reconstruct a X.50 multiplex, this memory must be read in a sequence which differs from the writing sequence. In addition, to ensure that the delay caused by this transformation into a regular multiplex is minimal, it is necessary that writing each beginning of the packet is followed as rapidly as possible by its read-out and more specifically independent of the position of the packet in the multi-frame.

Before the problem of realizing the means of addressing this memory in the read mode can be tackled, it is necessary to define the rules of this addressing.

Figure 4:
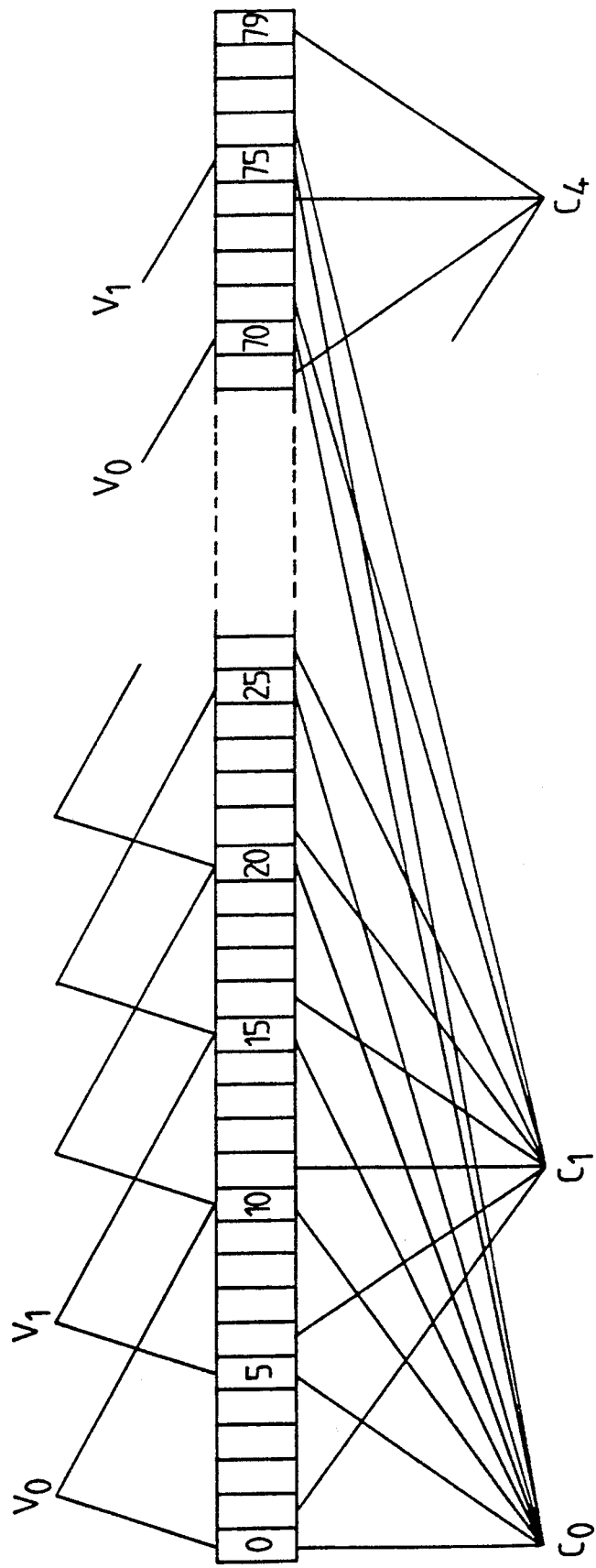
FIG. 4 shows an example of low-rate data transmission to the storage unit.

The X.50 frame comprises 5 channels denoted C0 to C4, each channel conveying data at the same rate. The number of paths conveyed in one and the same channel is consequently a function of the rates of these paths (19,200 bit/s, 9600 bit/s, 2400 bit/s, 1200 bit/s and 600 bit/s). FIG. 4 shows an example of low-rate data transmission in which the channel C0 conveys 2 paths at 4800 bit/s.

*Addressing rules for 9600 bit/s rates, the packet number PM being referenced by their location number EM in the memory.

Writing and reading the memory are effected in synchronism with the rate of the multi-frame. Writing the octet 0 of the packet P0 is immediately followed by its read-out.

The channel C0 conveys a path at 9600 bit/s. In 40 ms, a duration set of writing a packet of each of the channels C0 to C4, 64 octets are read in each of these channels. Consequently, the packet P0 is entirely read and the packet P8, which is the second packet of the channel P0 has its writing immediately followed by its read-out.

When an octet is represented by the symbol $P_m^n$, wherein m represents the number of the packet and n the number of the octet in the packet, the read sequence for the different packets of the channel C0 is as follows: $P0^0, P0^1, P0^2, \ldots, P0^{63}, P8^1, \ldots, P8^{63}, \ldots, P112^{63}, P120^0, \ldots, P120^{63}$.

Reading the 4 other channels is derived from reading the channel C0 taking into account that during 8 ms, a duration set for writing the 64 octets of the packet P0, $64/5 = 12.8$ bytes of each of these channels are read on an average, that is to say sometimes 12 octets and sometimes 13 octets. So as to ensure that each writing of the beginning of the packet of each channel Cx is followed as rapidly as possible by its read-out, it is necessary at the beginning of the multi-frame, to advance reading of each channel Cx. The fact should be taken into account that writing the first octet of the packets P0, P1, P2, P3 and P4 is followed by the respective reading of an octet from the channels C0, C4, C3, C2 and C1 and that therefore the respective shifts of 13, 26, 38 and 51 octets have to be effected.

For the different channels, addressing can be derived from that of the channel C0 by applying the following rules:

| Cx | No. of octet n | No. of packet m | if n > 64 |
|---|---|---|---|
| C0 | n0 | m0 | m0 |
| C1 | n0 + 51 | m0 + 121 | m0 + 121 + 8 |
| C2 | n0 + 38 | m0 + 122 | m0 + 122 + 8 |
| C3 | n0 + 26 | m0 + 123 | m0 + 122 + 8 |
| C4 | n0 + 13 | m0 + 124 | m0 + 122 + 8 |

The octet numbers n are calculated modulo-64 and the packet numbers m modulo-128. The value found for m must be augmented by 8 if n is higher than or equal to 64.

*Addressing rules for 4800 bit/s rates.

With 4800 bit/s rates, each channel comprises 2 paths V0 and V1. Reading the path V0 of the channel C0 is first effected in the packet P0, thereafter in the packet P16 and so on, ending in the packet P112. Let the reading sequence be as follows: $P0^0, P0^1, \ldots, P0^{63}, P16^1, P16^{63}, \ldots, P112^0, P112^{63}$.

Writing the octet 0 of the packets P0, P16, . . . , is immediately followed by its read-out. During the time in which 5 packets are written into the memory, 64 octets are read in each channel. Since each channel comprises 2 paths, 32 octets are read in each path of each channel, which implies that at the instant at which the packet conveying the path V1 of C0 is written, already 32 octets of this path have been read since the beginning of the multi-frame. Consequently, at the beginning of the multi-frame, reading this path must be advanced by 32 octets in the preceding packet.

Reading the paths of the 4 other channels is derived from that of the 2 paths of C0 taking account of the fact that during writing of a packet an average of 12.8 octets has been read in each channel and consequently 6.4 octets of each path, that is to say some times 6 octets and sometimes 7 octets. For the path V0 of the different channels, it is necessary to shift reading by 7, 13, 19 and 26 octets, respectively, while for the path V1 the reading operation must be shifted by 6, 13, 19 and 25 octets.

The addressing rule based on the addressing rule of the path V0 of the channel C0 is indicated in the following Table:

|       |        | V0   | V1   | if n > 64 |
|-------|--------|------|------|-----------|
| C0    | octet  | n0   | +32  |           |
|       | packet | m0   | +120 | +16       |
| C1    | octet  | +57  | +26  |           |
|       | packet | +113 | +121 | +16       |
| C2    | octet  | +51  | +19  |           |
|       | packet | +114 | +122 | +16       |
| C3    | octet  | +45  | +13  |           |
|       | packet | +115 | +123 | +16       |
| C4    | octet  | +38  | +7   |           |
|       | packet | +116 | +124 | +16       |

The table indicates the values to be added to those of n0 and m0. The octet numbers n are calculated modulo-64 and the packet numbers m are calculated modulo-128. The value found for m must be augmented by 16 if n is higher than or equal to 64.

*Addressing rules for 2400 bit/s rates.

With 2400 bit/s rates, each channel comprises 4 paths V0 to V3. Reading the path V0 of C0 is effected in the packets P0, P32, P64 and P96. Writing the octet 0 of the packets P0, P32, P64 and P96 is immediately followed by its read-out.

During the time 5 packets are written into the memory, 64 octets are read in each channel, and since each channel comprises 4 paths, 16 octets are read in each path of each channel. Consequently, for the other paths of the channel C0, reading at the beginning of the multi-frame must be effected 16, 32 and 48 octets, respectively, in advance, in the preceding packet.

Reading the paths of the 4 further channels is derived from reading the 4 paths of the channel C0, taking into account that during writing of a packet an average of 3.2 octets of each path are read, that is to say sometimes 3 octets and sometimes 4 octets. For the paths of the different channels, reading must be shifted by:

4, 7, 10 and 13 octets for the path V0
3, 7, 10 and 13 octets for the path V1
3, 6, 9 and 13 octets for the path V2
3, 6, 9 and 12 octets for the path V3.

The addressing rule based on the addressing rule of the path V0 of the channel C0 is indicated in the following Table which shows the values to be added to those of n0 and m0. The octet numbers n are calculated modulo-64 and the packet numbers m are calculated modulo-128. The value found for m must be augmented by 32 if n is higher than or equal to 64.

|       |        | V0   | V1   | V2   | V3   | if n >= 64 |
|-------|--------|------|------|------|------|-----------|
| C0    | octet  | n0   | +48  | +32  | +16  |           |
|       | packet | m0   | +104 | +112 | +120 | +32       |
| C1    | octet  | +60  | +45  | +29  | +13  |           |
|       | packet | +97  | +105 | +113 | +121 | +32       |
| C2    | octet  | +57  | +41  | +26  | +10  |           |
|       | packet | +98  | +106 | +114 | +122 | +32       |
| C3    | octet  | +54  | +38  | +23  | +7   |           |
|       | packet | +99  | +107 | +115 | +123 | +32       |
| C4    | octet  | +51  | +35  | +19  | +4   |           |
|       | packet | +100 | +108 | +116 | +124 | +32       |

*Addressing rules for the 1200 bit/s rates.

With a 1200 bit/s rate, each channel comprises 8 paths V0 to V7. Reading the path V0 of C0 is effected in the packets P0 and P64. Writing the octet 0 of the packets P0 and P64 is immediately followed by its read-out.

During the time that 5 packets are written in the memory, 64 octets are read in each channel, that is to say 8 octets in each channel. Consequently, for the other paths of the channel C0, the reading operation at the beginning of the multi-frame must be advanced by 8, 16, 24, ... and 56 octets, respectively, in the preceding packet.

Reading the path of the 4 other channels is derived from reading the channel C0, taking into account that during writing of a packet an average of 1.6 octets of each path are read, that is to say sometimes 1 octet and sometimes 2 octets. For the paths of the different channels reading must be shifted by:

2, 4, 5 and 7 octets for the paths V0 and V1
2, 3, 5 and 7 octets for the path V2
2, 3, 5 and 6 octets for the paths V3 and V4
1, 3, 5 and 6 octets for the path V5
1, 3, 4 and 6 octets for the paths V6 and V7.

The addressing rule on the basis of the addressing rule of the path V0 of the channel C0 is indicated in the following Table which shows the value to be added to those of n0 and m0, the octet numbers n are calculated modulo-64 and the packet numbers m are calculated modulo-128. The value found for m must be increased by 64 if n is higher than or equal to 64.

|       |        | V0   | V1   | V2   | V3   | V4   | V5   | V6   | V7   | if n > 64 |
|-------|--------|------|------|------|------|------|------|------|------|-----------|
| C0    | octet  | n0   | +56  | +48  | +40  | +32  | +24  | +16  | +9   |           |
|       | packet | m0   | +72  | +80  | +88  | +96  | +104 | +122 | +120 | +64       |
| C1    | octet  | +62  | +54  | +46  | +38  | +30  | +23  | +15  | +7   |           |
|       | packet | +65  | +73  | +81  | +89  | +97  | +105 | +113 | +121 | +64       |
| C2    | octet  | +60  | +52  | +45  | +37  | +29  | +21  | +13  | +5   |           |
|       | packet | +66  | +74  | +82  | +90  | +98  | +106 | +114 | +122 | +64       |
| C3    | octet  | +59  | +51  | +43  | +35  | +27  | +19  | +12  | +4   |           |
|       | packet | +67  | +75  | +83  | +91  | +99  | +107 | +115 | +123 | +64       |
| C4    | octet  | +57  | +49  | +41  | +36  | +26  | +18  | +10  | +2   |           |
|       | packet | +68  | +76  | +84  | +92  | +100 | +108 | +116 | +124 | +64       |

*Addressing rules for the 600 bit/s rates.

With 600 bit/s rates, each channel comprises 16 paths V0 to V15. Reading the path V0 of C0 is effected only in the packet P0. Writing the octet 0 is immediately followed by its read-out.

During the time in which 5 packets are written into the memory, 64 octets are read in each channel, that is to say 4 octets in each path. Consequently, for the other paths of the channel C0, reading at the beginning of the multi-frame must be advanced by 4, 8, 12, ... and 60 octets, respectively.

Reading the paths of the 4 other channels is derived from reading the channel C0, taking into account that during writing of a packet an average of 0.8 octets of each path are read, that is to say sometimes 0 and sometimes 1 octet. For the paths of the different channels reading must be shifted by:

1, 2, 3 and 4 octets for the paths V0, V1 and V2
1, 2, 3 and 3 octets for the paths V3, V4 and V5
1, 2, 2 and 3 octets for the paths V6, V7, V8 and V9
1, 1, 2 and 3 octets for the paths V10, V11 and V12
0, 1, 2 and 3 octets for the paths V13, V14 and V15.

The addressing rules based on the addressing rule of the path V0 of the channel C0 is indicated in the following Table which shows the values to be added to those of n0 and m0. The octet numbers n are calculated modulo-64.

|   |   | V0 V8 | V1 V9 | V2 V10 | V3 V11 | V4 V12 | V5 V13 | V6 V14 | V7 V15 |
|---|---|---|---|---|---|---|---|---|---|
| C0 | octet | n0 | +60 | +56 | +52 | +48 | +44 | +40 | +36 |
|    | packet | m0 | +8 | +16 | +24 | +32 | +40 | +48 | +56 |
|    | octet | +32 | +28 | +24 | +20 | +16 | +12 | +8 | +4 |
|    | packet | +64 | +72 | +80 | +88 | +96 | +104 | +112 | +120 |
| C1 | octet | +63 | +59 | +55 | +51 | +47 | +43 | +39 | +35 |
|    | packet | +1 | +9 | +17 | +25 | +33 | +41 | +49 | +57 |
|    | octet | +31 | +27 | +23 | +19 | +15 | +12 | +8 | +4 |
|    | packet | +65 | +73 | +81 | +89 | +97 | +105 | +113 | +121 |
| C2 | octet | +62 | +58 | +54 | +50 | +46 | +42 | +38 | +34 |
|    | packet | +2 | +10 | +18 | +26 | +34 | +42 | +50 | +58 |
|    | octet | +30 | +27 | +22 | +19 | +15 | +11 | +7 | +3 |
|    | packet | +66 | +74 | +82 | +90 | +98 | +106 | +114 | +122 |
| C3 | octet | +61 | +57 | +53 | +49 | +45 | +41 | +38 | +34 |
|    | packet | +3 | +11 | +19 | +27 | +35 | +43 | +51 | +59 |
|    | octet | +30 | +26 | +22 | +18 | +14 | +10 | +6 | +2 |
|    | packet | +67 | +75 | +83 | +91 | +99 | +107 | +115 | +123 |
| C4 | octet | +60 | +56 | +52 | +49 | +45 | +41 | +37 | +33 |
|    | packet | +4 | +12 | +20 | +28 | +36 | +44 | +52 | +60 |
|    | octet | +29 | +25 | +21 | +17 | +13 | +9 | +5 | +1 |
|    | packet | +68 | +76 | +84 | +92 | +100 | +108 | +116 | +124 |

*Addressing rules for the 19,200 bit/s rates.

A 19,200 bit/s path comprises 2 channels. In this example, the requirement is imposed that a 19,200 bit/s path utilizes either the channels 0 and 1 or the channels 2 and 3.

For the path utilizing the channels 0 and 1, reading is first effected in a packet of C0, thereafter in a packet of C1, thereafter again in a packet of C0 and thereafter in a packet of C1 etc. ...

Thus, the reading sequence is as follows: $P0^0$, $P0^1$, ..., $P0^{63}$, $P1^0$, ..., $P1^{63}$, $P8^0$, ..., $P9^0$, ..., $P9^{63}$, ..., $P120^0$, ..., $P121^0$, ..., $P121^{63}$.

For the portion of this path which is inserted in the channel C0 of the X.50 multiplex, the addressing rule is to read, in the above-indicated sequence of packets, one octet out of every two octets. And for the portion of this path which is inserted in the channel C1, the addressing rule is derived from the addressing rule relative to the channel C0 by adding +1 to the octet number. Writing the octet 0 of the packet P0 is immediately followed by its read-out.

Similarly, for the path utilizing the channels 2 and 3, reading is effected alternately in the packets of C2 and C3. During the time in which the packets P0 and P1 of the first path are written $(128\times2)/5=51.2$ octets of this second path are read.

Consequently, to ensure that the start of the writing of P2 is immediately followed by its read-out, it is necessary that at the beginning of the multi-frame, reading of this second path is advanced by 52 octets. Thus, for this path reading is effected in the following sequence: $P123^{12}, \ldots, P123^{63}, P2^0, \ldots, P2^{63}, \ldots, P3^0, \ldots, P3^{63}, P10^0, \ldots, P122^{63}, P123^0, P123^{11}$.

For the portion of this path that is inserted in the channel C2, the addressing rule is to read, in the packet sequence mentioned in the foregoing, one octet out of every two octets. And for that portion of the path that is inserted in the channel C3, the addressing rule is derived from the addressing rule relative to the channel C2 by adding +1 to the octet number. Reading the octet 0 of the packet P2 is effected after writing of the octet 4, that is to say less than 0.625 ms later.

Each of these two paths thus has its own addressing rule.

With the transformation rules described in the foregoing, the delays caused during transformation of the packets into multiplex are less than or equal to:

0.625 ms at 9600 bit/s
1.125 ms at 4800 bit/s
2.125 ms at 2400 bit/s
4.625 ms at 1200 bit/s
8 ms at 600 bit/s
0.625 ms at 19,200 bit/s.

Figure 5:
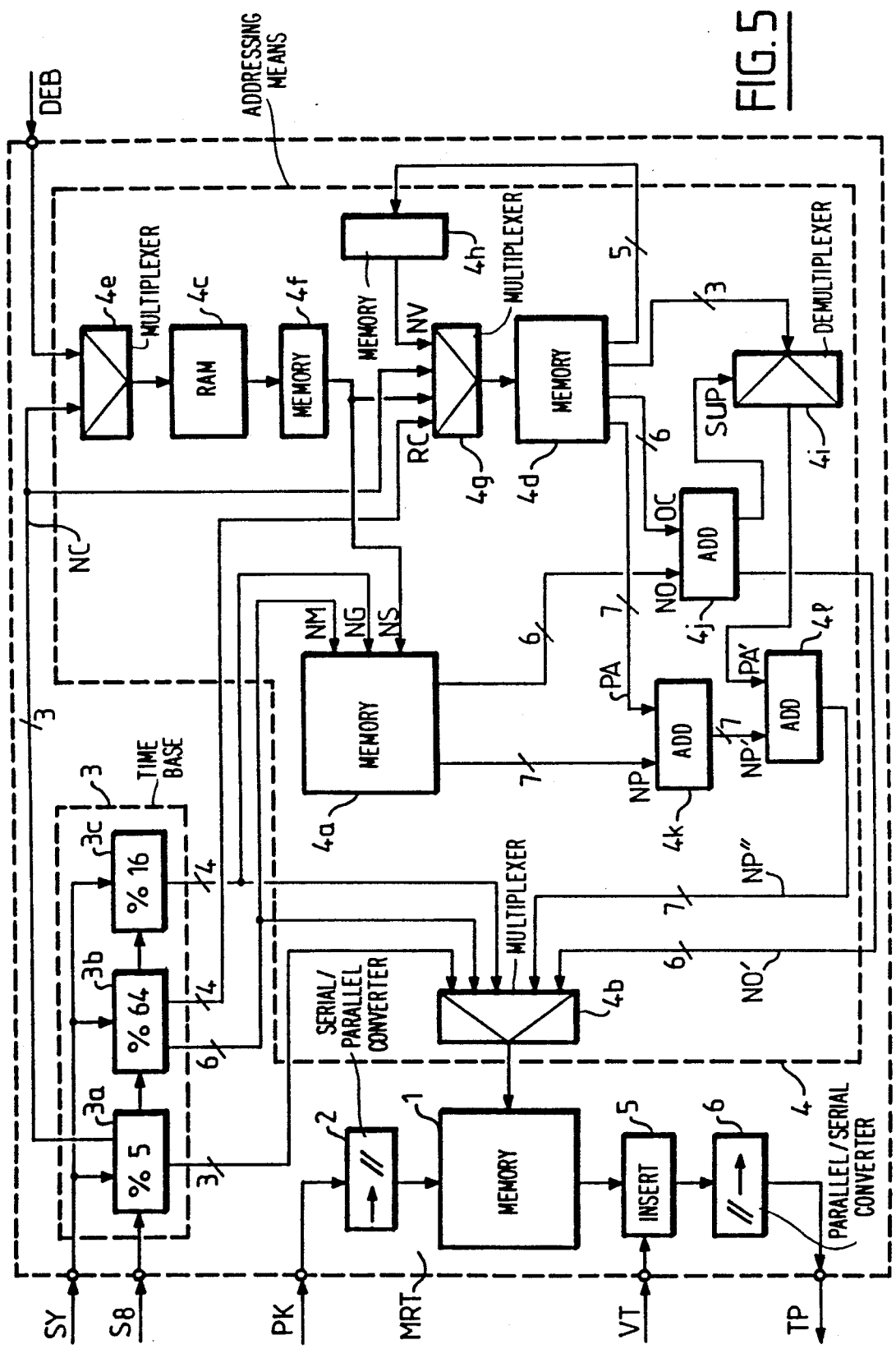
FIG. 5 shows the circuit diagram of the arrangement for transforming data packets into a regular multiplex in accordance with a predetermined frame, for data transmissions at different low rates.

The circuit diagram of the arrangement MRT for transforming the data packets into a regular multiplex and to reconstitute, in accordance with a predetermined frame, the data transmission at different low rates is shown in FIG. 5. In accordance with a characteristic feature of the invention, the arrangement MRT which receives the data at different low rates, includes a storage unit which is constituted by a random-access memory for entering one single multi-frame into the memory, and addressing means for writing and reading, under the control of a time base, said storage unit in accordance with predetermined rules which are mainly constituted by a combination of reprogrammable memories cooperating with adders and a random-access memory of limited size in which the speeds of the different low rates are indicated.

Figure 2:
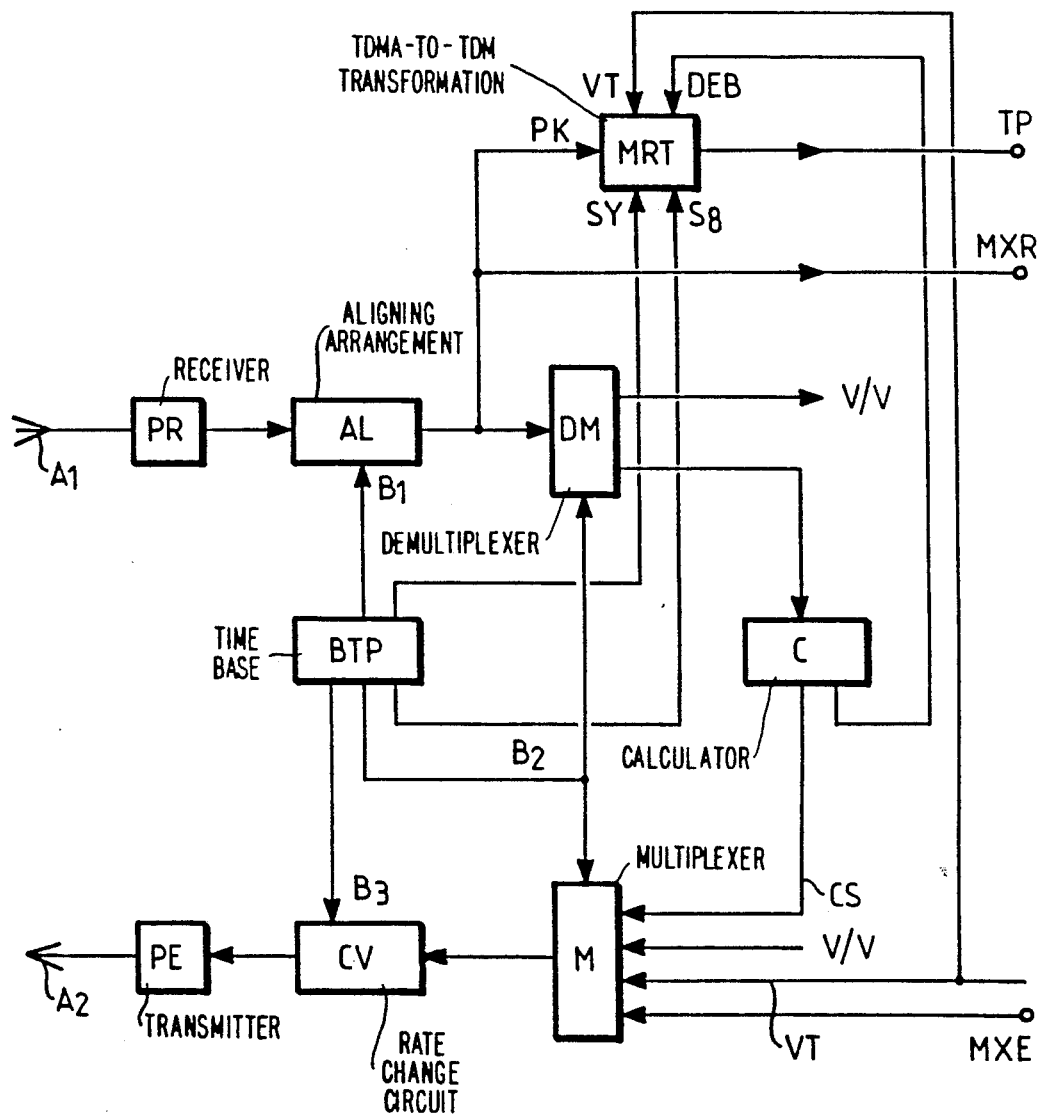
FIG. 2 shows the simplified basic circuit diagram of the main station of the data transmission system.

The storage unit 1 of the arrangement MRT is constituted by a single random-access memory containing 8192 octets in the embodiment. The 80 packets PK of the multi-frame are written into this memory after having been submitted to a series-to-parallel conversion by means of a series-to-parallel converter 2. Writing into the memory 1 is effected, in a regular manner described hereinafter, under the control of a time base 3 which is synchronized (signal SY) by the time base BTP (FIG. 2) of the station and controlled by a 8 kHz clock S8 which is also supplied by the time base BTP. Reading the memory 1 must be effected in a different sequence, fixed in such manner that the time, which separates the instant of writing a beginning of a packet and the instant at which it is read, is minimized. Read addressing of the memory 1 is defined by the addressing means 4 in accordance with the above-described addressing rules. The read instants are determined from a reprogrammable memory 4a, which can contain 8192 13-bit words, in which the addressing rule for the path V0 of the channel C0 is stored. To that end 8 sectors are defined in the memory 4a, each sector comprising 16 groups of 64 words. The distribution of the sectors is as follows:

a sector for the 9600 bit/s rate: the 16 groups are entirely different and contain the 64×16 addresses in which the information data from the path V0 of the channel C0 must be entered.

a sector for the 4800 bit/s rate: in each of the 16 groups, each word is repeated twice and the ensemble contains the 32×16 addresses in which the information data from the path V0 of the channel C0 must be entered.

a sector for the 2400 bit/s rate: in each of the 16 groups, each word is repeated 4 times and the ensemble contains the 16×16 addresses in which the information data from the path V0 of the channel C0 must be entered.

a sector for the 1200 bit/s rate: in each of the 16 groups each word is repeated 8 times and the ensemble comprises the 8×16 addresses in which the information data from the path V0 of the channel C0 must be entered.

a sector for the 600 bit/s rate: in each of the 16 groups each word is repeated 16 times and the ensemble contains the 4×16 addresses in which the information data from the path V0 of the channel C0 must be entered.

a sector for the 19,200 bit/s rate comprised in the channels C0 and C1: the 16 groups are entirely different and each group contains only one address out of two for the total of 2×64×16 addresses in which the information data from the path V0 of the channel C0 must be entered.

a sector similar to the preceding sector but relating to the 19,200 bit/s rate comprised in the channels C2 and C3.

Starting from this reprogrammable memory 4a, it is necessary to apply the adding rules defined in the preceding Tables to derive from the addressing of the path V0 of the channel C0 the new addressing which is a function of the rate, of the rank of the channel and the number of the path. To that end the time base 3 which is in phase with the packet multi-frame and operates at the rate of 8 kHz (64 kHz/8) is constituted by a divide-by-5 counter 3a which is followed by a divide-by-64 counter 3b and a divide-by-16 counter 3c. This time base permits addressing, in the read mode, of the memory 1 in which the different packets received during a multi-frame are entered. The 3-bit output of the counter 3a and the 4-bit output of the counter 3c render it possible to determine the address of the packet by means of a multiplexer 4b, whilst the 6-bit output of the counter 3b renders it possible to determine the address of the octet in the packet by means of the multiplexer 4b. For that purpose the divide-by-64 counter 3b produces the least significant bits and the divide-by-16 counter 3c produces the most significant bits, while the divide-by-5 counter 3a produces the bits of intermediate significance. In this way the procedure at the start of writing a word is effected while thereafter an other word is read.

The time base 3 also allows partial addressing of the reprogrammable memory 4a in which the read addressing rule of the path V0 of the channel C0 has been stored. The divide-by-64 counter 3b produces the least significant bits, that is to say the word number NM and the divide-by-16 counter 3c produces the bits of the intermediate significance, that is to say the number of the group NG (amongst the 16 groups).

Furthermore, it is possible by means of the time base 3 to address an arrangement which on the one hand allows the recognition of the sector number NS of the memory 4a used and on the other hand to determine the adding rule to be employed.

The arrangement by means of which the last-mentioned operations can be effected mainly utilises a random-access memory 4c of limited size and a reprogrammable memory 4d. The memory 4c for 5 words of 3 bits is addressed, via a multiplexer 4e by the divide-by-5 counter 3a producing the channel number NC. The calculator of the station writes, with the aid of the information signal DEB applied to the multiplexer 4e, in the word corresponding to each channel as a function of speeds of the rates conveyed by it, the sector number NS utilized in the memory 4a. For the 19,200 bit/s rate two different sector numbers are indicated, according to the channels set used (C0 and C1 or C2 and C3). The information NS is first stored in the memory 4f before being supplied to memory 4a.

The memory 4d storing 512 16-bit words is read twice. It is read a first time via a multiplexer 4g with the address given on the one hand by the sector number NS supplied by the memory 4c and stored in the memory 4f and on the other hand by the rank RC of the ensemble of 5 channels in the packet multi-frame. The rank RC of the 5 channels is given by the 4 first stages (of 4 bits) of the divide-by-64 counter 3b. The memory 4d then supplies, with 5 bits, the nature of the path used:

path V0 at 19,200 bit/s
path V0 at 9600 bit/s
path V0 or V1 at 4800 bit/s
path V0, V1, V2 or V3 at 2400 bit/s
path V0, V1, . . . V7 at 1200 bit/s
path V0, V1, . . . V15 at 600 bit/s.

Thus 32 possible path numbers NV (5 bits) are then available. The first read-out of the memory 4d is then stored in the memory 4h.

Thereafter the memory 4d is addressed a second time, via the multiplexer 4g, on the one hand by the divide-by-5 counter 3a which produces the channel number NC and on the other hand by the path number stored in the memory 4h. The memory 4d then supplies the following information:

value PA to be added to the number NP of the packet m supplied by the memory 4a, this value is given with 7 bits.

value 0C to be added to the number N0 of the octet n which is also supplied by the memory 4a, this value is given with 6 bits.

3 bit command NV' for a demultiplexer 4i which permits an additional adding operation PA' of 8, 16, 32 or 64 to the new packet number NP'=NP+PA, when the new octet number N0'=N0+0C is higher than or equal to 64.

Three adders permit to perform the additions which produce the packet numbers NP', NP''=NP'+PA' and the octet number N0' in the packet giving the read address of the memory 1.

The adder 4j gives the octet number N0' modulo-64 with 6 bits conveyed to the multiplexer 4b and also an indication SUP that the value 63 conveyed to the demultiplexer 4i is exceeded.

The adder 4k gives the intermediate value NP', modulo-128, with 7 bits of the packet number.

Finally, the adder 4l gives the definite value NP'' modulo-128 with 7 bits of the packet number to be conveyed to the multiplexer 4b. This value NP' is calculated from the result NP' of the adder 4k and the output PA' of the demultiplexer 4i validated by the value exceeding information SUP, the demultiplexer 4i supplying the values 8, 16, 32 or 64 in accordance with the command NV' indicated by the memory 4d.

An arrangement 5 for inserting X.50 frame alignment information into the first bit of each octet is arranged at the output of the memory 1, to which arrangement the frame alignment information VT is applied. The output of the arrangement 5 is followed by a converter 6 which produces a parallel-to-series conversion by supplying the information data TB in accordance with the predetermined frame.

Such an arrangement has the advantage that only one random-access memory of limited size must be modified, the 5 word memory 4C, when one wants to change the distribution of the speeds of the rates in the different channels.

Moreover, such a read procedure which minimizes the delay caused during the transformation of the packets into a regular multiplex can easily and advantageously be extended to form any multiplex structure. More specifically, it can be applied to the aligning arrangement AL of FIG. 2 permitting the transformation of a 32-packet frame into a 32 time interval multiplex, for a configuration of 32 paths at 64 kbit/s, and consequently for data of the same rate.

Thus, in accordance with a variant of the arrangement according to the invention, when this arrangement receives data packets in each time slot at the same rate, said arrangement is characterized in that the storage unit is constituted by a random-access memory for entering a single packet frame and the addressing means for writing and reading said storage unit, under the control of a time base, in accordance with a predetermined rule are mainly formed by a reprogrammable memory in which the addressing rule is stored, this addressing rule being such that writing a packet contained in a time slot is followed by reading the beginning of the packet before the beginning of the subsequent multiplex frame.

In this case the arrangement is considerably simplified. The time base 3 is then formed by a divide-by-64 counter followed by a divide-by-32 counter and the storage unit is constituted by a random-access memory 1 which contains only 2048 words. As regards the addressing means, they may be predominantly be of a construction as illustrated in FIG. 5.

either by the combination of the reprogrammable memory 4a which contains only 64 words and the reprogrammable memory 4d which contains only 32 words cooperating with the adders 4k and 4j, the adder 4l no longer being necessary and the memory 4c being superfluous since all the paths have the same speed;

or a single reprogrammable 64×32=2048 word memory in which the addressing rule of each of the 32 paths is stored (the set of the memories 4a and 4d and the adders 4k and 4j being advantageously replaced by said 2048 word memory).

The addressing rule takes account of the fact that during writing of a packet, 2 octets are read in each of the 32 packets. Reading of each of the packets is advanced by 2 octets relative to reading of the packet of a lower rank.

Using such an arrangement, writing the first octet of each packet is immediately followed by its read-out. When the transformation of the data packet into a regular multiplex is effected, the delay caused is in this case less than or equal to 0.125 ms, which is the frame duration of the multiplex.

What is claimed is:

1. A system for transforming a sequence of data packets including at least some packets containing data generated at one or more predetermined low-speed data rates, organized in time slots of successive time-division multiple-access frames, into a standard time-division multiplex frame format, said system comprising a data memory into which the sequence of data packets is entered, characterized by further comprising:

means for assigning address locations in said data memory, at which locations data are to be written, in a regular pattern based on the data rate at which said data were generated;

means for defining a plurality of different address patterns for reading out data from said data memory, each pattern corresponding to a respective predetermined data rate; and addressing means for writing a sequence of data having a given data rate into said data memory at locations corresponding to said regular pattern, and for reading out the data according to the one of said different address patterns corresponding to said given data rate, said different address patterns minimizing delay between writing and reading out of a data packet.

2. A system as claimed in claim 1, characterized in that said data memory is a random access memory for storing a single multi-frame of data packets received at different data packet rates;

the system further comprises a time base generator responsive to external timing signals synchronized with the data packet rate for generating time base signals; and said addressing means is responsive to the time base signals, and comprises a random access rate memory for storing data rate information, and means comprising logic gates and a reprogrammable memory for reading out data packets from said data memory in accordance with at least one of said plurality of different address patterns.

3. A system as claimed in claim 1, characterized in that said data memory is a random access memory for storing a single multi-frame of data packets received at different data packet rates;

the system further comprises a time base generator responsive to external timing signals synchronized with the data packet rate for generating time base signals;
said addressing means is responsive to the time base signals; and
said means for defining comprises a reprogrammable memory storing an addressing rule for reading out data packets from said data memory in accordance with the stored predetermined addressing rule, writing of a packet contained in a frame time slot being followed by reading the beginning of the packet before receiving the beginning of a subsequent multiplex frame.

* * * * *